Figure 1:
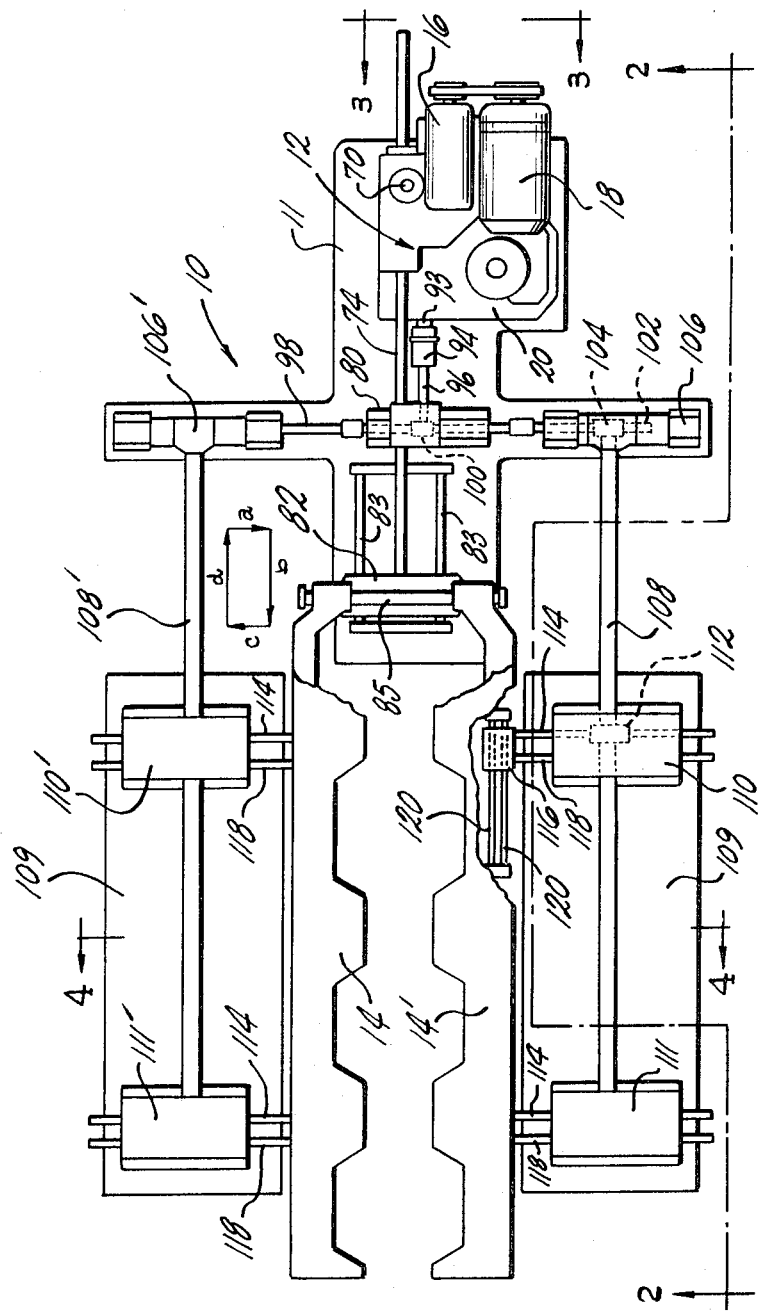

United States Patent
Wallis

[15] 3,661,247
[45] May 9, 1972

[54] TRANSFER DEVICE

[72] Inventor: Bernard J. Wallis, 25200 Trowbridge Avenue, Dearborn, Mich. 48124

[22] Filed: Aug. 28, 1970

[21] Appl. No.: 67,908

[52] U.S. Cl.................................................198/218, 74/55
[51] Int. Cl..........................................................B65g 25/04
[58] Field of Search.................198/221, 218; 74/109, 55, 54, 74/568, 567, 422, 29

[56] References Cited

UNITED STATES PATENTS

| | | | |
|---|---|---|---|
| 3,521,760 | 7/1970 | Wallis | 198/218 |
| 1,648,780 | 11/1927 | Nuessell | 74/55 X |
| 3,088,727 | 5/1963 | Pelagatti | 74/89.18 |
| 3,077,259 | 2/1963 | Braun | 198/218 |
| 3,428,166 | 2/1969 | Burke et al. | 198/218 |
| 3,262,511 | 7/1966 | De Gain | 198/218 X |
| 3,529,480 | 9/1970 | Kaspareck | 74/55 X |

*Primary Examiner*—Richard E. Aegerter
*Assistant Examiner*—Hadd S. Lane
*Attorney*—Barnes, Kisselle, Raisch & Choate

[57] ABSTRACT

A transfer device for indexing work-pieces between stations in a press-mounted die having longitudinally and laterally reciprocating workpiece-engaging finger bars. The drive means for both longitudinal and lateral motions comprises a single cam track engaging two cam followers. The longitudinal stroke is accurately maintained by reciprocating a shiftable rod between fixed stops and providing a yieldable member between the rod and drive means for absorbing overtravel of the drive means. The device is so constructed that substantially only the finger bars are shifted thereby reducing the inertia of the moving elements.

22 Claims, 7 Drawing Figures

INVENTOR
BERNARD J. WALLIS

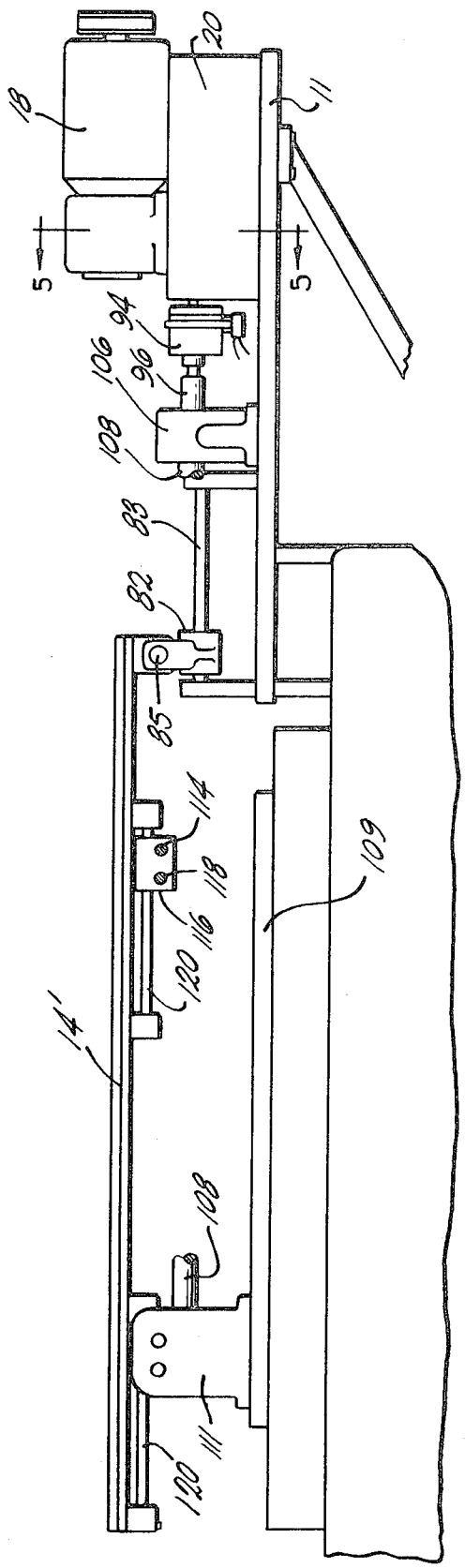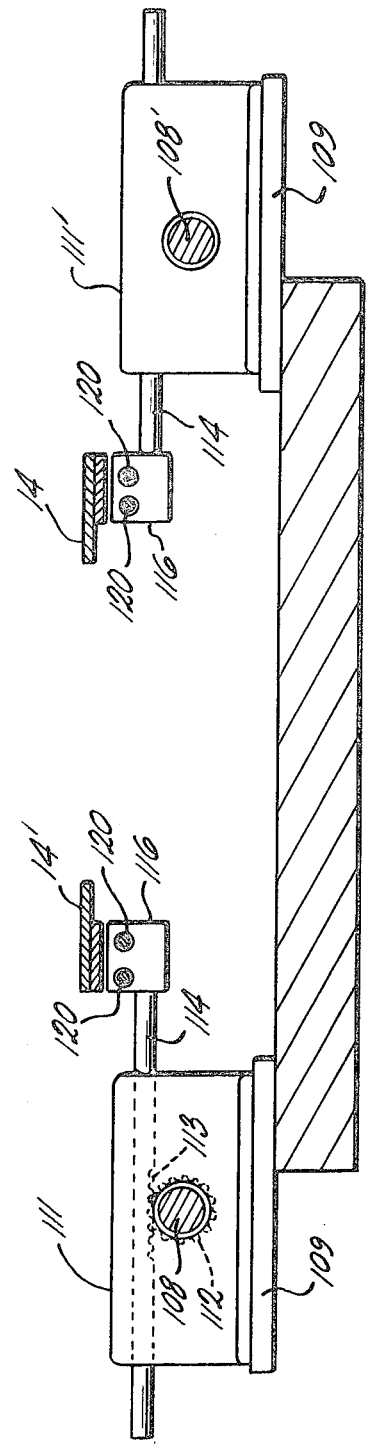

INVENTOR
BERNARD J. WALLIS

INVENTOR
BERNARD J. WALLIS

BY

Barnes, Kisselle, Raisch & Choate

ATTORNEYS

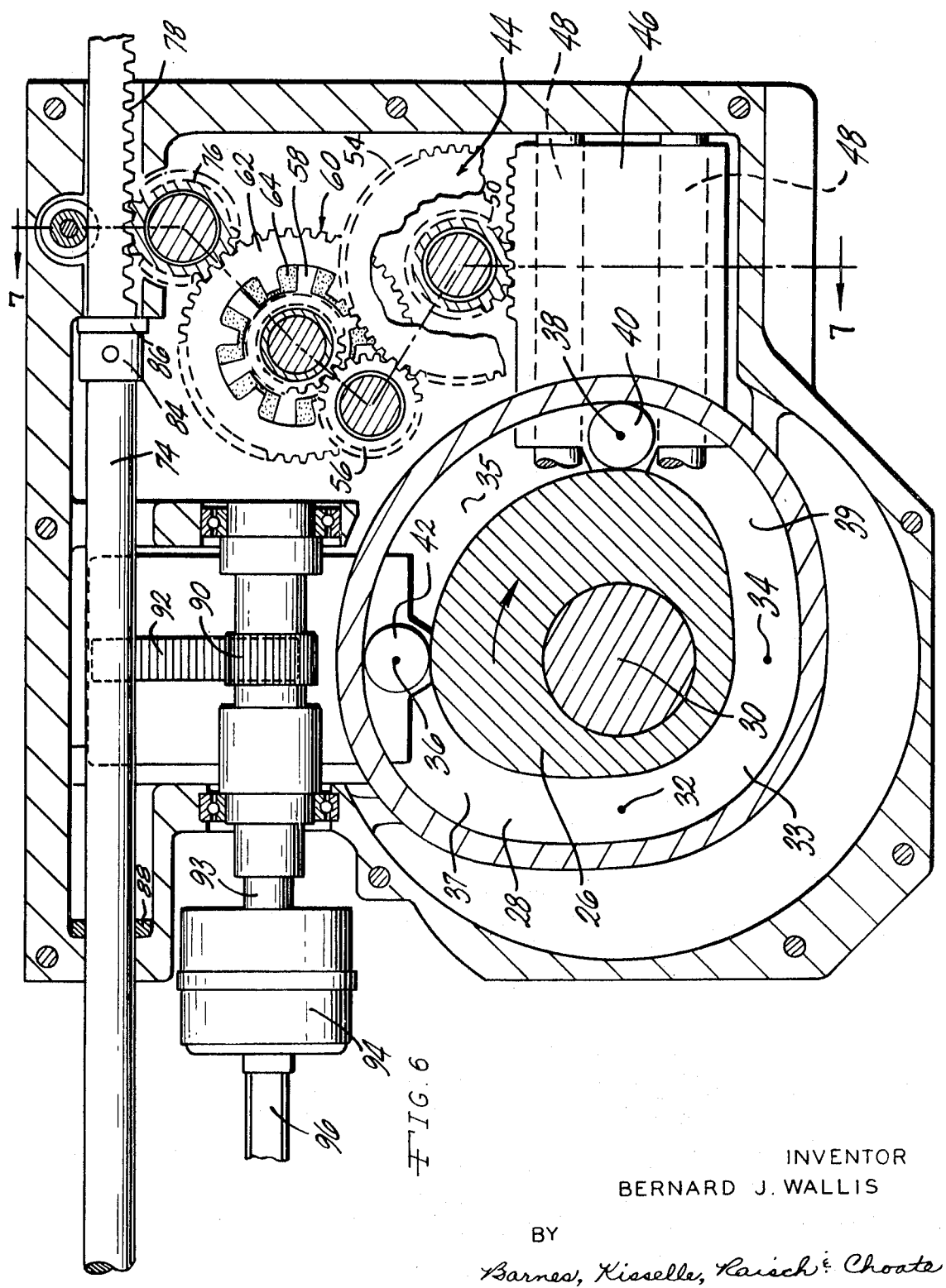

TRANSFER DEVICE

This invention relates to a work transfer device for indexing workpieces between stations in a press-mounted transfer die. More particularly the invention is concerned with providing a transfer device having a drive means of minimal size and capable of indexing workpieces with a high degree of accuracy.

While it is desirable to use a multiplicity of gears for shifting the workpiece-engaging elements of a transfer device between stations to thereby reduce the overall size of the drive arrangement, the cumulative effect of gear tolerances produces backlash which reduces the accuracy of the transfer stroke. The transfer accuracy is further reduced by moving components of the mechanism which have high inertias.

It is an object of the present invention to provide a transfer device which while using a multiplicity of gears in the drive arrangement for indexing workpieces has a very accurate transfer stroke which is unaffected by gear tolerances.

It is also an object of this invention to provide a transfer device having a drive arrangement which allows the transfer stroke length to be increased without increasing the overall size of the drive arrangement.

It is a further object of this invention to provide a transfer device of improved accuracy by employing moving components having low inertias.

Figure 3:
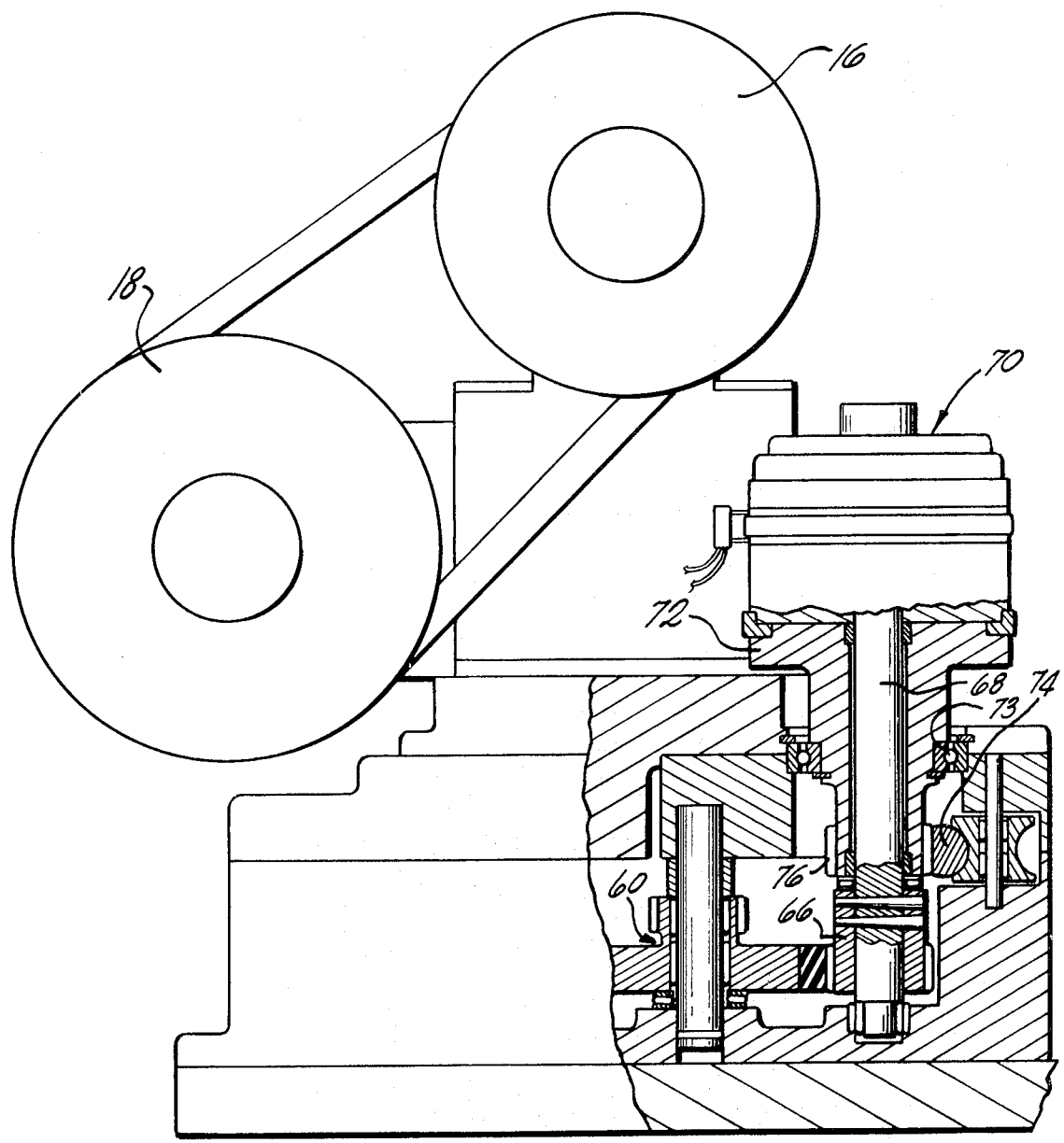
Figure 5:
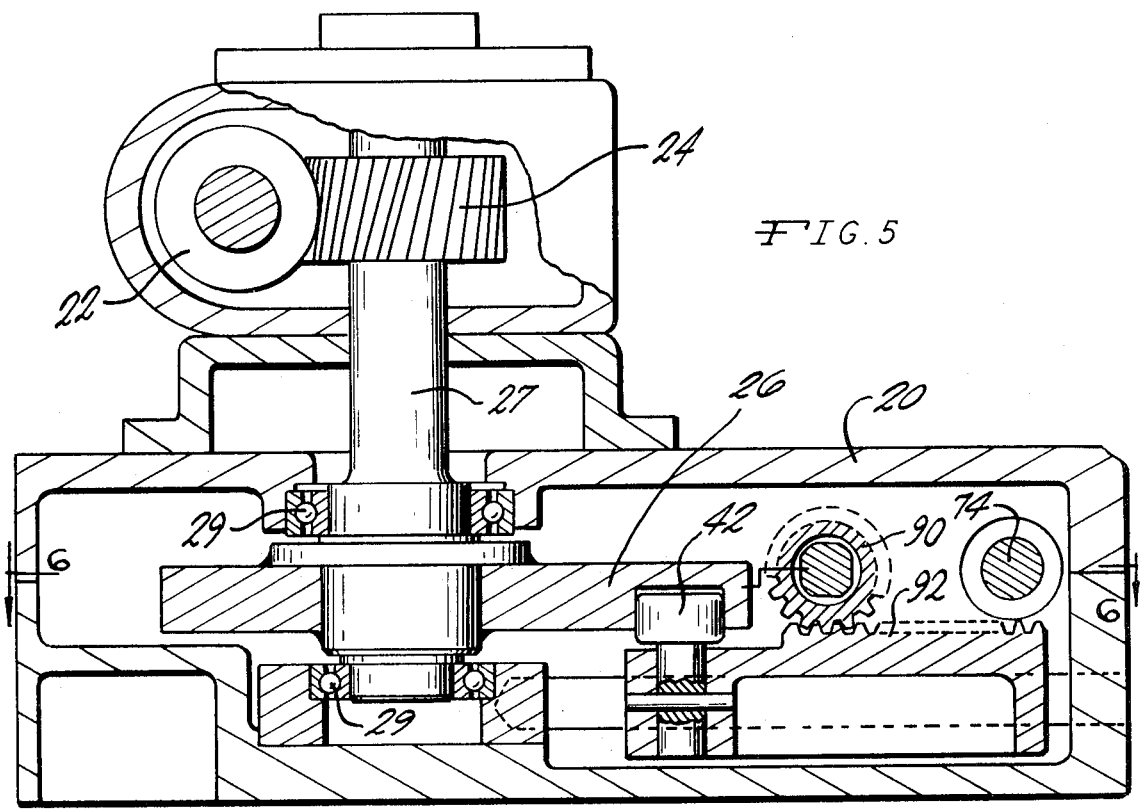
Figure 7:
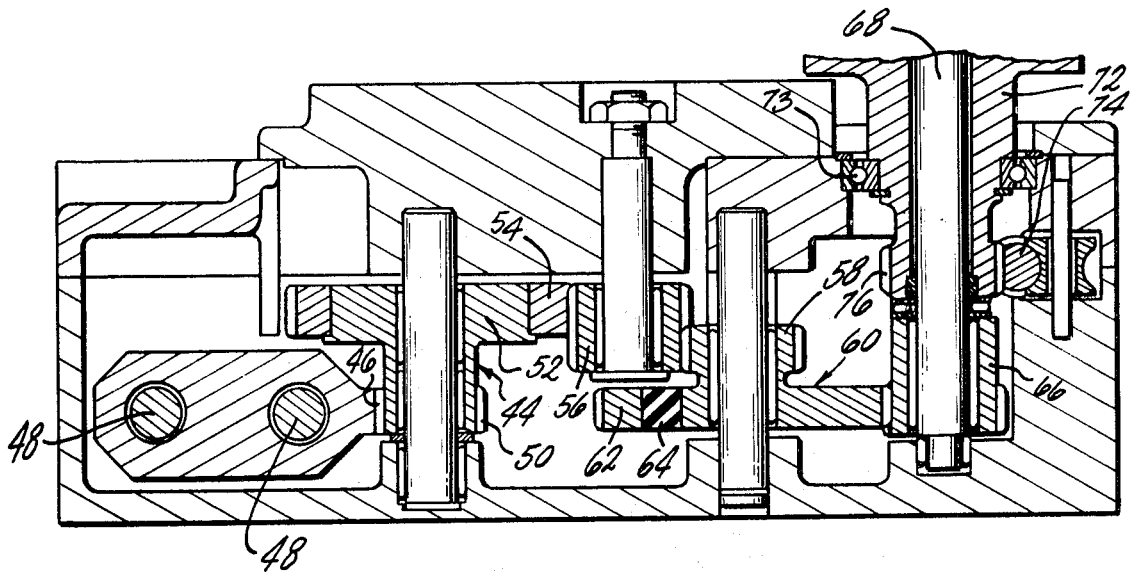

In the drawings:

FIG. 1 is a plan view of a transfer device embodying the present invention.
FIG. 2 is a view taken along line 2—2 in FIG. 1.
FIG. 3 is a view taken along line 3—3 in FIG. 1.
FIG. 4 is a sectional view taken along line 4—4 in FIG. 1.
FIG. 5 is a sectional view taken along line 5—5 in FIG. 2.
FIG. 6 is a sectional view taken along line 6—6 in FIG. 5.
FIG. 7 is a sectional view taken along line 7—7 in FIG. 6.

Referring to the drawings, FIG. 1 shows a transfer device 10 mounted on a base 11 having a drive unit shown generally at 12. Drive 12 is adapted to shift the workpiece-engaging elements 14, 14', also referred to as finger bars. Finger bar 14 is shifted according to the sequence indicated by the arrows $a$, $b$, $c$, and $d$, the motion of finger bar 14' being symmetrically opposite to that of finger bar 14. In operation, finger bar 14 is first extended transversely along arrow $a$ to engage workpieces (not shown), and is then indexed longitudinally forward in the direction of arrow $b$. Next, finger bar 14 is retracted from the work along arrow $c$, and is finally returned along arrow $d$ to its initial position.

Drive arrangement 12 comprises a motor 16 drivingly connected to a speed reducer assembly 18. Referring to FIGS. 5, 6, and 7 reducer 18 is mounted upon the top surface of a housing 20 and has an output worm gear 22 (FIG. 5) meshing with a pinion gear 24. Pinion 24 drives a cam plate 26 by means of a vertically extending shaft 27 which is supported on bearings 29 within housing 20. An endless cam track 28 (FIG. 6) is provided in plate 26. Track 28 is formed of a first segment 33 extending 90° at a constant radius about center point 30 between the points 32 and 34. A second segment 35 of track 28 extends 90° at a larger radius about center 30 between the points 36 and 38. A third segment 37 connects points 32 and 36 while a fourth segment 39 connects points 34 and 38. A pair of cam follower rollers 40,42 ride in track 28 and are spaced 90° apart about center 30. The motion of follower 40 controls the longitudinal stroke of finger bars 14,14' while follower 42 directs the transverse stroke of the finger bars.

Follower 40 is operatively connected with a gear assembly 44 by means of a rack 46 slidable on guide bars 48. Gear assembly 44 comprises a pinion shaft 50 which meshes with rack 46. A ring gear 54 is attached to the flanged portion 52 of shaft 50 and drives an idler gear 56. Gear 56 in turn meshes with a second pinion shaft 58 which forms a portion of gear assembly 60. Gear assembly 60 further comprises a ring gear 62 and a yieldable center portion 64 which connects shaft 58 with gear 62. Center portion 64 is preferably formed of urethane which may be integrally molded between the radially fingered portions of pinion shaft 58 and gear 62 to form gear assembly 60. Gears 44, 56 and 60 comprise a set of change gears which may be conveniently replaced by additional sets of change gears to vary the overall gear ratio. In this way the transfer stroke may be increased without increasing the overall size of the drive arrangement.

Ring gear 62 drives a gear 66 which is pinned to the input shaft 68 of an overload protection device 70. Overload protection device 70 (FIG. 3) is similar to that described in my copending application Ser. No. 12,271, filed Feb. 18, 1970, now U.S. Pat. No. 3,599,067, issued Aug. 10, 1971. The output shaft 72 of overload device 70 coaxial with and surrounding input shaft 68 is supported for rotation within housing 20 by a set of bearings 73. If an overload is encountered, device 70 breaks the operative connection between input shaft 68 and output shaft 72. An output gear 76 attached to shaft 72 drives a gear rack 78 formed in one end of a horizontally extending rod 74.

In FIG. 1 rod 74 extends through housing 20 and a gear housing 80, and is fixably coupled to a saddle 82 which is slidably supported for longitudinal motion on guides 83. Guide bar 85 on saddle 82 guides finger bars 14,14' for transverse motion and also forms the operative connection between saddle 82 and finger bars 14,14' for longitudinally shifting the finger bars. A collar 84 (FIG. 6) is pinned to rod 74 within housing 20 and is adapted to abut stops 86,88 at opposite ends for limiting the travel of rod 74.

Follower 42 is operatively connected with a pinion 90 by means of a rack 92 (FIGS. 5 and 6). Pinion 90 in turn rotates the input shaft 93 of a second overload device 94 which operates in similar fashion to overload device 70. Referring to FIG. 1, the output shaft 96 of overload device 94 shifts a rod 98 by means of a gear and rack arrangement 100 within gear housing 80. Rod 98 extends through gear housing 80 and has rack portions 102 formed at its opposite ends which respectively drive pinions 104 within housings 106,106'. Housings 110, 110', 111, 111' are mounted on base plates 109 and have drive shafts 108,108' extending therethrough from housings 106,106'. Shaft 108 is driven by pinion 104 within housing 106 while shaft 108' is driven by an idler gear (not shown) which is driven by the other pinion 104 (not shown) within housing 106'. The idler gear enables shafts 108,108' to rotate in opposite directions in response to the shifting of rod 98 to thereby transversely extend and retract finger bars 14,14' in unison. Referring to FIG. 4, within each housing 110, 110', 111, 111' a pinion 112 is coupled to its respective shaft 108, 108' and drives a rack portion 113 formed in rod 114.

Affixed to the opposed inner ends of each rod 114 is a guide block 116 which supports finger bars 14,14'. (FIGS. 1, 2 and 4) Guide shafts 120 fixedly mounted on the underside of finger bars 14,14' are bushed within blocks 116 and permit longitudinal motion of the finger bars relative to rods 114. Additional rigidity for blocks 116 as well as support for finger bars 14,14' is supplied by the stabilizer rods 118.

With the arrangement described the only components of the transfer device which are longitudinally shifted by the transfer stroke of rod 74 are saddle 82 and finger bars 14,14'. The design of the finger bars is dictated by the size and shape of the workpiece to be transferred. The saddle is designed to provide an operative connection between rod 74 and finger bars 14,14' for longitudinally shifting the finger bars. Thus, these designs may be executed so as to provide a transfer mechanism having reciprocating members of minimum inertia. The benefits derived from such an arrangement include reduced frictional and inertial forces and increased transfer accuracy, as well as reduced cost.

The operation of the transfer mechanism and the novel features thereof are more fully understood by a description of the operating cycle. While one operating cycle of the transfer device is completed by a full 360° revolution of cam plate 26, the cycle is more clearly described with reference to four quarter-revolutions of 90° each. Since followers 40,42 are spaced 90° apart about center 30 and track 28 is formed of four 90° segments, follower 42 is engaged by the cam segment following and adjacent the segment engaging follower 40.

Thus, in FIG. 6, as cam plate 26 is rotated through a first 90° arc in the clockwise direction follower 40 is engaged by segment 35 of cam track 28 and follower 42 is engaged by segment 37. Since segment 35 defines an arc of constant radius about center 30 no motion is imparted to follower 40. However, segment 37 shifts follower 42 radially inwardly to thereby rotate shaft 96. In turn, the rotation of shaft 96 is applied to the finger bar actuating mechanism to extend finger bars 14,14'.

As cam plate 26 rotates through a second 90° arc follower 40 is shifted radially inwardly by segment 37 while follower 42 remains in a radially fixed position within segment 33. The motion of follower 40 is transmitted through the transfer drive arrangement comprising rack 46, gears 44, 56, 60, 66, 76 and overload device 70 to shift rod 74 to the left in FIG. 6. Rod 74 is shifted to the left until collar 84 abuts stop 88. The low inertia of finger bars 14,14' and saddle 82 reduces the impact force of collar 84 against stop 88. With collar 84 abutting stop 88 follower 40 is still within segment 37, which is designed to urge rod 74 slightly further than collar 84 permits. Hence, with rod 74 stopped by the abutment of collar 84 with stop 88, follower 40 is shifted a small additional distance. The additional motion of follower 40 rotates gears 44,56 and attempts to rotate gear 60. Since ring gear 62 of gear assembly 60 is prevented from further rotation by the abutment of collar 84 with stop 88 it can be rotated no further. However, the yieldable center portion 64 coupling gear 62 with pinion 58 is designed to circumferentially yield and absorb the added rotation imparted to pinion 58. As segment 37 disengages follower 40 a continuing force is transmitted by the next segment 33 to maintain collar 84 against stop 88. Since finger bars 14,14' are operatively connected by means of saddle 82 with rod 74 they are accurately shifted and maintained in the forward transfer position.

As plate 26 rotates through the third 90° arc, segment 39 shifts follower 42 radially outwardly so as to retract finger bars 14,14' while follower 40 is maintained in position by segment 33.

With plate 26 rotating through the fourth 90° arc, segment 39 shifts rod 74 to the right in FIG. 6 while follower 42 is engaged by segment 35. The action of segment 39 with follower 40 shifts rod 74 by means of the gear arrangement previously described until collar 84 abuts stop 86. Segment 39 is designed, as is segment 37, to shift rod 74 slightly further than collar 84 permits, the overtravel being absorbed by the circumferentially yieldable portion 64 of gear 60. Thus as follower 40 leaves segment 39 and enters segment 35, a continuing force is applied to urge collar 84 against stop 86.

While in the preferred embodiment of the drive arrangement cam track 28 comprises four 90° segments such as those just described and followers 40,42 are spaced 90° apart, it should be apparent that modifications may be made to this particular arrangement. If desired the angular extents of segments 33,35 may be increased while the angular extents of segments 37,39 are decreased. This would provide a simultaneous dwell in both the transverse and longitudinal movements of the finger bars while increasing the speeds at which the finger bars are transversely and longitudinally shifted. Also the spacing between followers 40,42 may be reduced if desired, but the spacing is preferably not less than the maximum angular extent of the larger of segment 37 or segment 39.

It is apparent from the above description that the stroke length of rod 74 equals the distance between stops 86 and 88 minus the length of collar 84. The stroke accuracy is limited only by how precisely these dimensions are measured.

Cam track 28 is designed such that with each drive component at its low tolerance rod 74 would be shifted a distance slightly greater than its stroke length if collar 84 were not attached to rod 74. Thus, rod 74 is always shifted a distance exactly equal to the desired stroke length independent of drive gear tolerances, with the overtravel designed into the drive arrangement being absorbed by rubber portion 64 of gear 60.

The stroke length of rod 74 can be changed by replacing change gears 44, 56 and 60 with another set of change gears having a different overall ratio and by replacing collar 84 with another collar of different length compatible with the new change gears. It is therefore unnecessary to provide a new cam plate for each new stroke length since the basic rectilinear movements of the finger bars remain the same regardless of their stroke length. Normally there is no need to adjust the transverse stroke, and no such adjustment means are provided in the disclosed embodiment of the device.

While no control means are disclosed, it will be appreciated that the control of the transfer device may be interlocked with the press control in any of several conventional ways, and that the speed of motor 16 may be set as required.

I claim:

1. In a transfer device for indexing workpieces between successive stations in a press-mounted die the combination comprising a base, a workpiece-engaging finger bar and means mounting the finger bar for movement on said base in perpendicularly related longitudinal and transverse directions comprising a rectilinear guideway on said base extending parallel to said longitudinal direction, a guide member engaging said guideway and constrained to move longitudinally in said guideway, said guide member having a guideway thereon extending transversely to said first mentioned guideway, said finger bar having means thereon engaging said second guideway so that the finger bar is shifted longitudinally in response to movement of said guide member in the first mentioned guideway and is shifted in said transverse direction in response to movement thereof relative to said guide member, a drive unit, drive means operatively connecting said drive unit with said guide member for reciprocating the guide member in the first guideway, said finger bar having a guideway thereon extending parallel to said longitudinal direction, guide means engaged with said last mentioned guideway and constrained to move in said longitudinal direction relative to said finger bar and drive means for transversely reciprocating said finger bar connected with said guide means and forming the sole transverse driving connection between said drive unit and said finger bar.

2. The combination called for in claim 1 wherein said means on said finger bar engaging said second guideway are disposed adjacent one end of the finger bar and said guide member is a saddle carrying said transverse guideway.

3. The combination called for in claim 2 wherein said transversely reciprocating drive means comprises two housings spaced from each other on said base and laterally of said finger bar and each having a transversely reciprocating rod extending therefrom connected with said guide means for transversely reciprocating said finger bar.

4. In a transfer device for indexing workpieces between successive stations in a press-mounted die, said device having a workpiece-engaging finger bar shiftable in a longitudinal direction lengthwise of the die and shiftable in a direction generally transverse to said longitudinal direction, the combination comprising a single endless cam track rotatable about an axis for controlling both longitudinal and transverse motions of said finger bar, drive means for rotating said cam track about said axis, means operatively connecting said cam track with said finger bar for controlling longitudinal finger bar motion comprising a first cam follower engaging said cam track and means operatively connecting said first cam follower with said finger bar and means operatively connecting said cam track with said finger bar for controlling transverse finger bar motion comprising a second cam follower engaging said cam track and means operatively connecting said second cam follower with said finger bar, said cam track having portions for causing displacement of said first and second cam followers so that upon rotation of said cam track by said drive means said finger bar is longitudinally shifted in response to displacement of said first cam follower and is transversely shifted in response to displacement of said second cam follower whereby the single cam track generates controlled longitudinal and transverse finger bar motions.

5. The combination of claim 4 wherein said cam track surrounds said axis and said cam followers are arranged for radial displacement relative to said axis in response to rotation of said cam track.

6. The combination called for in claim 5 wherein said cam track and said first and second cam followers are adapted to shift said finger bar sequentially in longitudinal and transverse directions to execute a rectangular path of movement.

7. The combination called for in claim 5 wherein said cam track comprises a first segment extending arcuately about said axis at a fixed radial distance therefrom, a second segment extending arcuately about said axis at a fixed radial distance therefrom, said last mentioned distance being greater than said first mentioned distance, a third segment connecting one end of said first segment with the circumferentially adjacent end of said second segment and a fourth segment connecting the other end of said first segment with the other end of said second segment.

8. The combination called for in claim 7 wherein the cam followers are angularly spaced apart so that each of said segments is engaged by only one cam follower at any one time.

9. The combination called for in claim 7 wherein the sum of the angular extents of the first and second segments equals at least 180°.

10. The combination called for in claim 9 wherein said first and second segments each has an angular extent of 90°.

11. The combination called for in claim 10 wherein said third and fourth segments each has an angular extent of 90°.

12. The combination called for in claim 11 wherein said cam followers are angularly spaced apart 90°.

13. The combination called for in claim 5 wherein the operative connections between the cam followers and the finger bar include means for amplifying the radial displacements of the cam followers such that the longitudinal and transverse displacements of the finger bar are greater than the radial displacements of the respective cam followers.

14. In a transfer device for indexing workpieces between successive stations in a press-mounted die, said device having a workpiece-engaging finger bar shiftable in a longitudinal direction lengthwise of the die and shiftable in a direction generally transverse to said longitudinal direction, the combination comprises a base on which said finger bar is mounted for longitudinal reciprocation between forward and return limit positions, a drive member mounted on said base for movement in opposite directions and means interconnecting said finger bar and said member such that the longitudinal finger bar movement is proportional to the movement of said member to a high degree of accuracy, abutment means on said base and said member positioned for forcible interengagement so as to constrain the movement of said member to an accurately predetermined distance and correspondingly the stroke of said finger bar to between said forward and return limit positions, means for moving said member over said accurately predetermined distance to thereby move said finger bar between its longitudinal limit positions comprising drive means and a drive mechanism operatively connecting said drive means with said drive member and tending in response to operation of said drive means to move said drive member a distance slightly greater than said accurately predetermined distance as limited by said abutment means, said drive mechanism including a yieldable member for absorbing slight overtravel of said drive means upon interengagement of said abutment means, means for maintaining said abutment means in forcible interengagement when said finger bar is at its limit positions and means for transversely shifting the finger bar with the finger bar at its limit positions while forcible interengagement of the abutment means is maintained.

15. The combination called for in claim 14 wherein said yieldable member is a gear assembly comprising an input gear coaxial with an output gear and a yieldable portion operatively connecting said input gear with said output gear.

16. The combination called for in claim 15 wherein said drive mechanism includes a set of change gears.

17. The combination of claim 14 wherein said means for moving said drive member includes cam means and cam follower means operatively connecting said drive means with said drive member, said cam means having a portion for displacing said cam follower means such that said drive member is shifted over said accurately predetermined distance as limited by interengagement of said abutment means and a portion for maintaining forcible interengagement of said abutment means with the finger bar at its limit positions while the finger bar is being transversely shifted.

18. The combination of claim 17 wherein said cam means comprises an endless cam track rotatable about an axis and said cam follower means comprises a cam follower engaging said track and arranged for radial displacement relative to said axis, said drive means being operatively connected to rotate said cam track and said cam follower being operatively connected to said drive member such that when said cam track is rotated, said cam follower is radially displaced to thereby move said drive member over said accurately predetermined distance.

19. The combination of claim 18 wherein the radial displacement of said cam follower tends to move said drive member a distance slightly greater than said accurately predetermined distance as limited by said abutment means.

20. The combination of claim 19 wherein said yieldable member is operatively connected between said cam follower and said drive member for absorbing slight overtravel of said cam follower.

21. The combination of claim 18 wherein said drive member comprises a rod shiftable on said base and said abutment means comprises a collar on said rod and stop means on said base, said collar being adapted to interengage said stop means for limiting the stroke thereof.

22. The combination of claim 21 further including means for amplifying the displacement of said cam follower into a substantially greater stroke of the rod.

* * * * *

PO-1050
(5/69)

UNITED STATES PATENT OFFICE
CERTIFICATE OF CORRECTION

Patent No. 3,661,247          Dated May 9, 1972

Inventor(s) WALLIS, Bernard J.

It is certified that error appears in the above-identified patent and that said Letters Patent are hereby corrected as shown below:

Column 6, Line 17    Cancel "15" and insert -- 14 --

Signed and sealed this 1st day of August 1972.

(SEAL)
Attest:

EDWARD M. FLETCHER, JR.      ROBERT GOTTSCHALK
Attesting Officer             Commissioner of Patents